(12) United States Patent
Djupsjöbacka

(10) Patent No.: US 8,649,687 B2
(45) Date of Patent: Feb. 11, 2014

(54) METHODS AND DEVICES FOR MODULATING A SIGNAL

(75) Inventor: Anders Djupsjöbacka, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 200 days.

(21) Appl. No.: 13/102,186

(22) Filed: May 6, 2011

(65) Prior Publication Data
US 2011/0274441 A1 Nov. 10, 2011

(30) Foreign Application Priority Data
May 7, 2010 (EP) ...................... 10162304

(51) Int. Cl.
*H04B 10/04* (2011.01)
(52) U.S. Cl.
USPC ............ 398/185; 398/182; 398/184; 398/188
(58) Field of Classification Search
None
See application file for complete search history.

(56) References Cited

U.S. PATENT DOCUMENTS

| | | | | |
|---|---|---|---|---|
| 8,488,979 B2 * | 7/2013 | Kim et al. | ...... | 398/185 |
| 2008/0239448 A1 * | 10/2008 | Tanaka et al. | ...... | 359/245 |
| 2009/0022498 A1 * | 1/2009 | Shibutani | ...... | 398/152 |
| 2009/0257755 A1 * | 10/2009 | Buelow | ...... | 398/184 |
| 2009/0324253 A1 | 12/2009 | Winzer | | |
| 2010/0080571 A1 * | 4/2010 | Akiyama et al. | ...... | 398/184 |

FOREIGN PATENT DOCUMENTS

| | | |
|---|---|---|
| EP | 2164199 A2 | 3/2010 |
| WO | 2009035513 A1 | 3/2009 |

* cited by examiner

Primary Examiner — Shi K Li
Assistant Examiner — Merlin Brito Peguero
(74) Attorney, Agent, or Firm — Coats & Bennett, PLLC

(57) ABSTRACT

The invention relates to a method in a transmitting node for transmitting a modulated optical carrier signal over an optical channel in an optical communications network to a receiving node. The method enables full use of the polarization domain within a Poincaré sphere when modulating the optical carrier signal.

14 Claims, 14 Drawing Sheets

DP-QPSK
A: (0000, 0101, 1111, 1010)
B: (0010, 0100, 1101, 1011)
C: (0011, 0110, 1100, 1001)
D: (0001, 0111, 1110, 1000)

4Pol-QPSK (Gray code)
A: (0000, 0001, 0011, 0010)
B: (0100, 0101, 0111, 0110)
C: (1100, 1101, 1111, 1110)
D: (1000, 1001, 1011, 1010)

8Pol-QPSK (Gray code)
A: (00000, 00001, 00011, 00010)
B: (00100, 00101, 00111, 00110)
C: (01100, 01101, 01111, 01110)
D: (01000, 01001, 01011, 01010)
E: (11000, 11001, 11011, 11010)
F: (11100, 11101, 11111, 11110)
G: (10100, 10101, 10111, 10110)
H: (10000, 10001, 10011, 10010)

8Pol-QPSK-ASK (Gray code)

A: (100000, 100001, 100011, 100010)
B: (100100, 100101, 100111, 100110)
C: (101100, 101101, 101111, 101110)
D: (101000, 101001, 101011, 101010)
E: (111000, 111001, 111011, 111010)
F: (111100, 111101, 111111, 111110)
G: (110100, 110101, 110111, 110110)
H: (100011, 100011, 110111, 110010)
A': (000000, 000001, 000011, 000010)
B': (000100, 000101, 000111, 000110)
C': (001100, 001101, 001111, 001110)
D': (001000, 001001, 001011, 001010)
E': (011000, 011001, 011011, 011010)
F': (011100, 011101, 011111, 011110)
G': (010100, 010101, 010111, 010110)
H': (010000, 010001, 010011, 010010)

METHODS AND DEVICES FOR MODULATING A SIGNAL

RELATED APPLICATION

This application claims priority under 35 U.S.C. §119(a) to European Patent No. EP10162304.9, which was filed May 7, 2010 and is incorporated herein by reference in its entirety.

TECHNICAL FIELD

The invention relates to a transmitter, a method therein, a receiver and a method therein. In particular, the invention relates to phase and polarisation modulation of an optical carrier signal.

BACKGROUND

In communications networks of today the amount of information communicated over the network has increased. High speed links between network nodes are being used to enable high transmission rates. In optical networks a transceiver arrangement in a network node is arranged to convert electrical data into optical data and transmit the optical data on an optical channel. The optical data is received at a receiving network node and converted back to electrical data. In the field of optical communication modulation of carrier signal in more complex form than the traditional on-off keying is today used to increase the bit rate of data over the optical channel. The modulation of the carrier signal results in that the state of the carrier signal corresponds to a certain input data, whereas a state may in fact contain data corresponding to a number of bits. Hence, by increasing the number of states a carrier signal may take more information, and more bits per second may be transmitted on that carrier. There are different ways to modulate a carrier signal, for example, by modulating the carrier signal in amplitude, phase, frequency, or a combination of parameters. Also, modulating the carrier signal by polarisation of the carrier signal in the polarisation domain may be performed. The idea of using the polarisation domain is not new. It was used in the late 80s and the early 90s with pure polarisation modulation, i.e. no amplitude or phase modulation, and with analogue Stokes receivers, wherein the first wave used non-coherent receivers the second wave coherent receivers.

Today there is a new generation of coherent receivers compared to those developed in the late 80s and discussions of how to mix polarisation modulation with coherent quadrature phase-shift keying (QPSK) systems are ongoing. In this context, not just by using dual polarisation or polarisation multiplexing schemes but using more advanced modulation schemes. WO2009124861 A1 discloses a modulation scheme wherein an optical signal is modulated between a plurality of different states of polarisation and between different phase states. The plurality of polarisation states comprises second states of polarisation located outside the great circle of the Poincaré sphere thereby providing more information per symbol with no or low additional optical signal to noise ration penalty. However, this scheme does focus on the distance between the different states and has a limited maximum of six polarisation states.

SUMMARY

There is an object of embodiments herein to provide a mechanism that enables full use of the polarisation domain, that is, complete coverage of the Poincaré sphere, when modulating an optical carrier signal.

According to a first aspect of the present solution the object is achieved by providing a method in a transmitting node for transmitting data information on a modulated optical carrier signal over an optical channel in an optical communications network to a receiving node. The transmitting node receives a data signal indicating the data information to be transmitted and generates a carrier signal. In addition, the transmitting node splits the carrier signal into two separate signals, a first signal fed to a first modulator for performing In-phase/Quadrature modulation and a second signal fed to a second modulator for performing In-phase/Quadrature modulation. The first modulator is driven by a first drive signal and a second drive signal and the second modulator is driven by a third drive signal and a fourth drive signal. Thus, the transmitting node modulates the first signal in the first modulator by applying the first and second drive signals to the first modulator, and the second signal in the second modulator by applying the third and fourth drive signals to the second modulator. Quadrature components in the first signal and in the second signal are respective phase shifted in a phase shifter.

Furthermore, the transmitting node modulates the modulated first signal in a third modulator for polarisation modulation by applying a fifth drive signal to the third modulator. The transmitting node also modulates the modulated second signal in a fourth modulator for polarisation modulation by applying a sixth drive signal to the fourth modulator. The third modulator is driven by the fifth drive signal and the fourth modulator is driven by the sixth drive signal. The transmitting node additionally extracts all drive signals from the received data signal and synchronizes all drive signals. The transmitting node also synchronizes the first signal with the second signal.

The transmitting node then combines the modulated polarised first signal from the third modulator with the modulated polarised second signal from the further modulator and finally transmits the combined signal over the optical channel to the receiving node.

In order to perform the method a transmitting node is provided for transmitting data information on the modulated optical carrier signal over the optical channel in the optical communications network. The transmitting node comprises a receiving circuit configured to receive the data signal indicating the data information to be transmitted and a generating circuit configured to generate a carrier signal. Furthermore, the transmitting node comprises a splitting circuit coupled to the generating circuit and configured to split the carrier signal into two separate signals. The signal is split into a first signal fed to a first modulator for performing In-phase/Quadrature modulation and a second signal fed to a second modulator for performing In-phase/Quadrature modulation. The first modulator is driven by a first drive signal and a second drive signal and the second modulator is driven by a third drive signal and a fourth drive signal.

In addition the transmitting node comprises a modulating circuit comprising the first, second modulators and two phase shifters. The modulating circuit is coupled to the splitting circuit and the receiving circuit and is configured to modulate the first signal in the first modulator by applying the first and second drive signals to the first modulator, and the second signal in the second modulator by applying the third and fourth drive signals to the second modulator. A quadrature component in the first signal and a quadrature component in the second signal are configured to be phase shifted in respective phase shifter.

The transmitting node also comprises an additional modulating circuit comprising a third modulator for polarisation modulation and a fourth modulator for polarisation modulation. The additional modulating circuit is coupled to the modulating circuit and the receiving circuit, and is configured to modulate the modulated first signal in the third modulator by applying a fifth drive signal to the third modulator and the modulated second signal in the fourth modulator by applying a sixth drive signal to the fourth modulator. The third modulator is driven by the fifth drive signal and the fourth modulator is driven by the sixth drive signal. The transmitting node further comprises an extraction circuit coupled to the receiving circuit and configured to extract all drive signals from the received data signal. The transmitting node comprises a synchronizing circuit configured to synchronize the first signal with the second signal. The synchronizing circuit is also coupled to the extraction circuit and further configured to synchronize all the drive signals.

The transmitting node also comprises a combining circuit coupled to the modulating circuits and configured to combine the polarisation modulated first signal from the third modulator with the polarisation modulated second signal from the fourth modulator. In addition, the transmitting node comprises a transmitting circuit coupled to the combining circuit and configured to transmit the combined signal over the optical channel to the receiving node.

In embodiments herein a full use of the polarisation domain is provided by providing the combination of I/Q modulators and polarisation modulators.

According to a second aspect of the present solution the object is achieved by providing a method in a receiving node for demodulating a modulated signal received over an optical channel from a transmitting node. The transmitting and receiving nodes are comprised in an optical communications network. The receiving node receives a combined polarisation modulated carrier signal from the transmitting node. The carrier signal has been split into two separate signals, a first and second signal, which first and second signals have been In-phase/Quadrature modulated. A quadrature component in the first signal and a quadrature component in the second signal have been phase shifted. The modulated first signal has further been polarisation modulated and the modulated second signal has been polarisation modulated and these signals have been combined and transmitted over the optical channel to the receiving node 11.

The receiving node then demodulates the received combined polarisation modulated carrier signal by extracting signals of a Poincaré sphere from the received combined polarisation modulated carrier signal. The extracted signals are used to determining state of the received combined polarisation modulated carrier signal indicating transmitted data.

In order to perform the receiving method for demodulating a modulated signal received over an optical channel from a transmitting node a receiving node is provided. The receiving node comprises a receiving circuit configured to receive a combined polarisation modulated carrier signal from the transmitting node. The carrier signal has been split into two separate signals, a first and second signal, which first and second signals have been In-phase/Quadrature modulated. A quadrature component in the first signal and a quadrature component in the second signal have been phase shifted. The modulated first signal has further been polarisation modulated and the modulated second signal has been polarisation modulated and these signals have been combined and transmitted over the optical channel to the receiving node 11.

The receiving node further comprises a demodulating circuit coupled to the receiving circuit and configured to demodulate the received combined polarisation modulated carrier signal. The demodulating circuit is configured to extract signals of a Poincaré sphere from the received combined polarisation modulated carrier signal, which signals are used to determine state of the received combined polarisation modulated carrier signal.

Thus, herein a combination of I/Q modulation and polarisation modulation to a carrier signal is provided enabling full use of the polarisation domain.

BRIEF DESCRIPTION OF THE DRAWINGS

Embodiments will now be described in more detail in relation to the enclosed drawings, in which.

DETAILED DESCRIPTION

Figure 1:
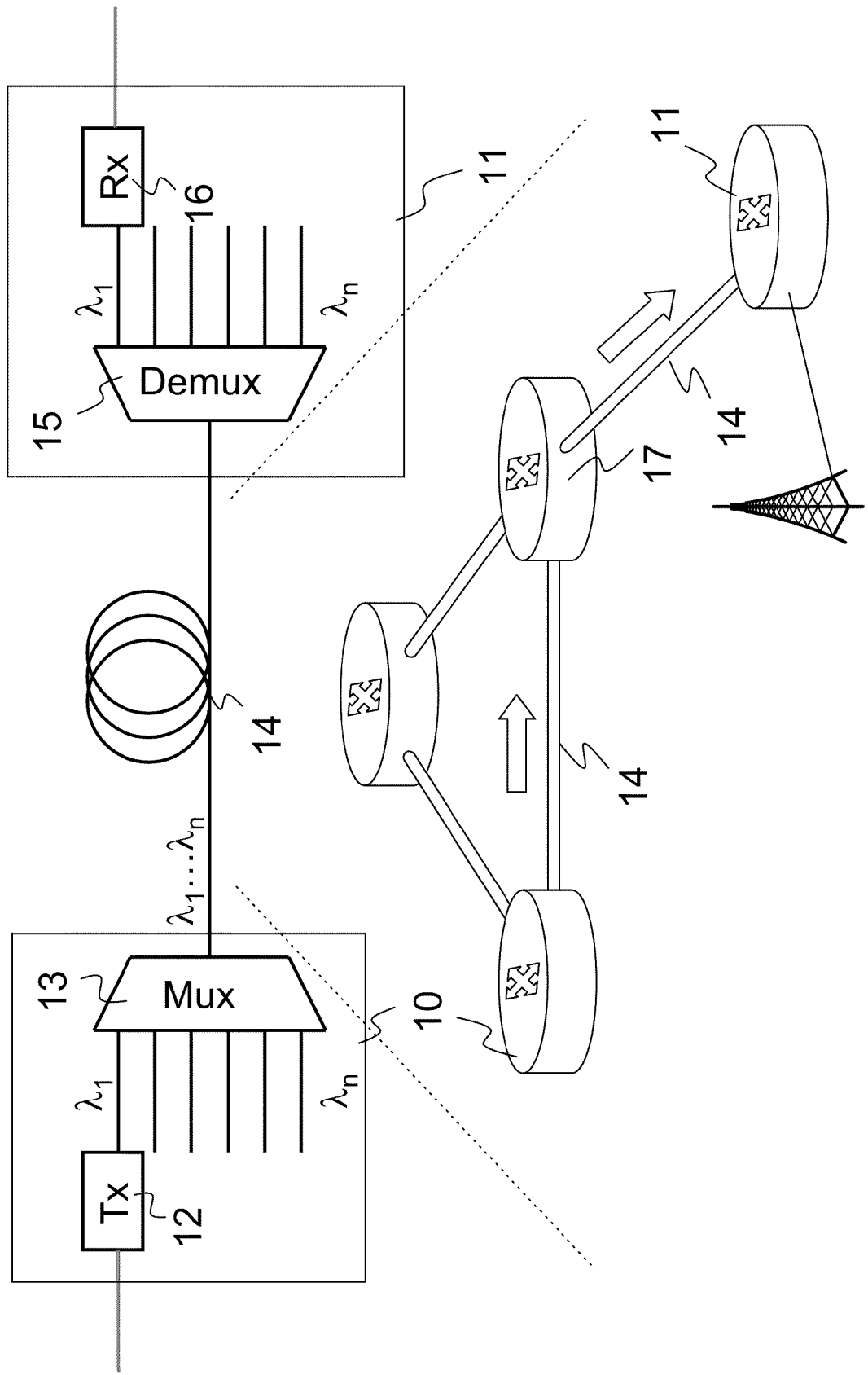
FIG. 1 is a schematic overview depicting an optical communications network.

FIG. 1 is a schematic overview depicting an optical communication network in different views. The optical communication system comprises a core edge node, also referred to as a transmitting node 10, arranged to transmit an optical carrier signal indicating information to a receiving node 11 within the optical communications network. The receiving node 11 may comprise a base station, a router or the like.

An electrical signal is received at the transmitting node 10 and is converted in a transmitter (Tx) 12 into an optical signal on a specific wavelength ($\lambda_1$). The optical signal may be multiplexed in a multiplexer 13 with other optical signals with different wavelengths ($\lambda_1$-$\lambda_n$). The optical signal is then transmitted over a fibre 14 to the receiving node 11 where the signal is demultiplexed in a demultiplexer 15 and is converted back into the electrical domain in a receiver (Rx) 16.

The fibre 14 may be a point-to-point connection as well as a wavelength route in an optical network, which is illustrated in FIG. 1. The optical signal may be routed via a routing node 17 to the destined receiving node 11.

In order for the transmitting node 10 to modulate the optical carrier signal according to the present solution a modulator chip is implemented in the transmitting node 10. By using the modulator chip full use of the polarisation domain, that is, full coverage of the Poincaré sphere, when modulating an optical carrier signal is achieved.

Figure 2:
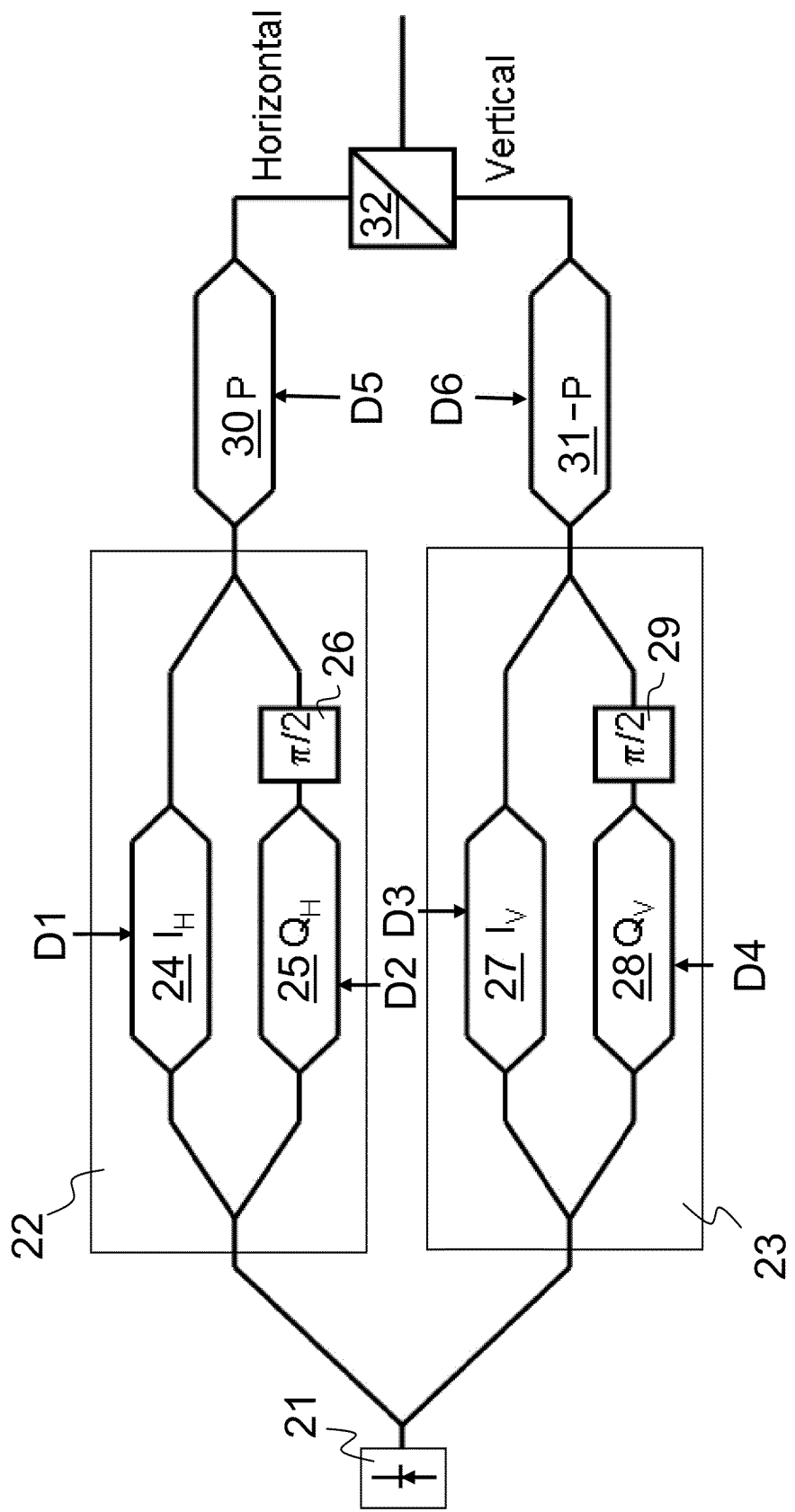
FIG. 2 is a schematic block diagram depicting a modulator chip in a transmitting node.

FIG. 2 is a schematic overview depicting according to a present solution a modulator chip comprising circuits in the transmitting node 10. The transmitting node 10 uses an optical carrier signal Si to transmit data to the receiving node 11, which optical carrier signal Si is modulated in the modulator chip.

The optical carrier signal Si is generated in a semiconductor laser 21 and is plan polarised as the optical modulators often are polarisation sensitive. The optical carrier signal Si is split up into a first signal Si1 and a second signal Si2 in an optical splitter. The first signal is fed to and modulated in a first In-phase/Quadrature (I/Q) modulator 22 and the second signal Si2 is fed to and modulated in a second I/Q modulator 23. The first I/Q modulator 22 is formed by two entities such as a first interferometer 24 for the in-phase component and a second interferometer 25 for the quadrature component. The output signal from the second interferometer 25 assigned to the quadrature component is being shifted by $\pi/2$ in a shifter 26 compared to the output signal of the first interferometer 24 assigned the in-phase component.

Similarly, the second I/Q modulator 23 is formed by two entities, such as a third interferometer 27 for the in-phase component and a fourth interferometer 28 for the quadrature component. The output signal from the fourth interferometer 28 assigned to the quadrature component is being shifted by $\pi/2$ in a second shifter 29 compared to the output signal of the third interferometer 27 assigned the in-phase component.

Furthermore, a resulting modulated first signal Si1$m$ is received and modulated in a first polarisation modulator 30 and a resulting modulated second signal Si2$m$ is received and modulated in a second polarisation modulator 31. The split signals are then combined in a polarisation combiner 32. Thus, the I/Q modulators 22,23 modulate the split signal with the same plane polarisation and a polarisation rotation is performed just before the signals are combined together.

The I/Q modulators 22,23 and the Polarisation modulators 30,31 are controlled by drive signals D1-D6. The drive signals are dependent on the data to be transmitted and hence, the drive signals D1-D5 are extracted from a received data signal, which data signal indicates what to transmit; D6 being an inverse of D5. The drive signals D1-D6 are further synchronized with one another to be able to generate the desired modulation state. Thus, modulator chip generates two drive signals D1, D2, binary or four level, for controlling the first I/Q modulator 22 and two drive signals D3, D4 for controlling the second I/Q modulator 23. The first polarisation modulator 30 is driven by a fifth drive signal D5 and the second polarisation modulator 31 is driven by a sixth drive signal D6, which in the illustrated example is the inverse of the fifth drive signal D5. Both polarisations x and y are combined in the polarisation combiner 32. The output signal of the polarisation combiner 32 is fed on the fibre 14.

The synchronised drive signals and the combination of I/Q modulators and polarisation modulators enables full use of the polarisation domain to provide increased number of polarisation states. This enables more bits to be represented by every state.

Figure 3:
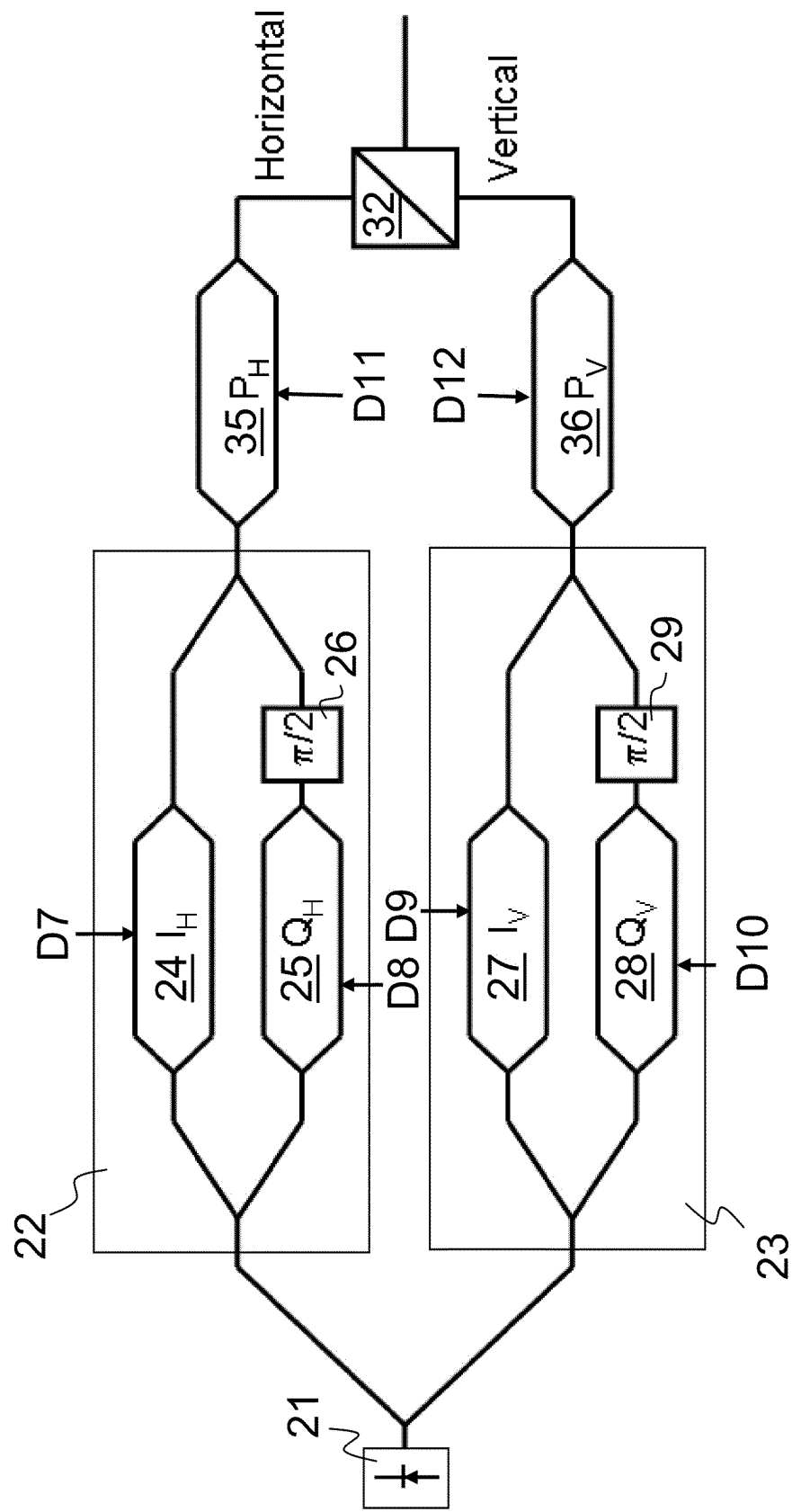
FIG. 3 is a schematic block diagram depicting a modulator chip in a transmitting node.

FIG. 3 is a schematic overview of a different configuration of a modulator chip in the transmitting node 10. The modulator chip comprises, as explained with reference to FIG. 2, the semiconductor laser 21, the first I/Q modulator 22, the second I/Q modulator 23, the first interferometer 24, the second interferometer 25, the shifter 26, the third interferometer 27, the fourth interferometer 28, the second shifter 29, and the polarisation combiner 32.

However, the modulator chip in FIG. 3 comprises a different first polarisation modulator 35 $P_H$ and a different second polarisation modulator 36 $P_V$ replacing the first polarisation modulator 30 and the second polarisation modulator 31. These different polarisation modulators 35, 36 differs from the previous polarisation modulators 30,31 in the manner of being driven by 4-level signals drive signals instead of 2-level, i.e. binary, signals as the polarisation modulators 30,31 are driven with. Thereby enabling more number of polarisation states to be transmitted.

The modulator chip in FIG. 3 is generic, i.e. it may address all polarisations, all phases, and all intensity levels. The modulator chip may be complemented with a "pulse carver", i.e. an extra modulator to perform Return to Zero (RZ)-modulation to further increase the number of polarisation states. The polarisation combiner 32 may either be comprised in the traditional way outside the transmitter chip, or as a hybrid solution, or as integrated solution on chip together with a Y-branch.

The modulator chip in FIG. 3 is driven by drive signals D7-D12, which may correspond to the drive or may be different than the drive signals D1-D6 of the modulator chip in FIG. 2. The drive signals D7-D12 are dependent on the data to be transmitted and hence, the drive signals D7-D12 are extracted from a received data signal, which data signal indicates what to transmit. The drive signals are further synchronized with one another to be able to generate the wanted modulation state.

FIG. 3 may be an illustration of an 8Pol-QPSK-Amplitude Shift keying (ASK) modulator chip, which may be designed in many different ways. Binary signals are used as drive signals if the modulator chip is to produce 8Pol-QPSK modulation and a mix of binary and 4-level signals are used as drive signals if the modulator chip is to produce 8Pol-QPSK-ASK modulation. The IQ-modulators 22,23 work in the same way as in a traditional Dual Polarisation (DP)-QPSK modulator but here the IQ-modulators 22,23 are controlling the phase, a $s_2$ and a $s_3$ parameter in the Poincaré sphere of the modulated signal, see below for definition. The P-modulators 30,31,35, 36 are controlling the amplitude and a s1 parameter in the Poincaré sphere of the modulated signal, see FIG. 4 for definition.

In the 8Pol-QPSK case, FIG. 2, the polarisation modulators, 30 P and 31 −P, are driven with binary signals in push-pull mode but not with full modulation amplitude. Here 3 dB in power will be lost in modulation losses compared to a DP-QPSK transmitter. In the 8Pol-QPSK-ASK case, FIG. 3, the polarisation modulators, 35 $P_H$ and 36 $P_V$, are driven with 4-level signals but not with full modulation amplitude.

The modulator chip is generic which means that it may reach the complete 4-dimensional Polarisation-Phase-Amplitude domain where polarisation represents 2 dimensions and phase and amplitude 1 dimension each. This means that the chip may produce a variety of xPol-yPSK-zASK modulation formats and not just the 8Pol-QPSK-ASK modulation format presented here.

For 8Pol-QPSK, the drive signals to the modulators are intended to be binary, i.e. two-level modulated signals. As FIG. 2 indicates, the transmitter modulator chip requires 6 different drive-signals of which two of them are each others inverse—i.e. 5 signals containing information bits. These signals have to be extracted from the incoming data-signal. Drivers are intended to be designed for binary modulation, but with adjustable amplitude and bias levels. In FIG. 2 there are 6 drivers $I_H$, $Q_H$, $I_V$, $Q_V$, P, −P used and fed with the 5 different binary signals D1-D5 and the sixth drive signal D6 being the inverse of the fifth drive signal D5. For 8Pol-QPSK- ASK, FIG. 3, a similar situation is faced, but with six drive signal D7-D12 of which 4 are binary $I_H$, $Q_H$, $I_V$, $Q_V$ and two are 4-level $P_H$, $P_V$.

Time synchronization of the 6 drive signals D1-D6 and D7-D12 is an important issue. In contrary to a DP-QPSK system where it is only asked for synchronization of the drive signals for the two IQ-modulators separately, all of the 6 drive-signals D1-D6 and D7-D12 need to be synchronised to each other and run the modulator chip in FIG. 2 with the synchronized drive signals D1-D6 and the modulator chip in FIG. 3 with the synchronized drive signals D7-D12.

Traditional DP-DPSK does not require synchronization between the two polarisations since they are regarded as two separate channels. In the receiver, the symbol decision is taken separately for each side. Thus, neither envelope, the drive signals, nor phase synchronization of optical carrier is needed in the transmitter. However, in the present solution nPOL-mPSK uses polarisation states which are spread out from the Poincaré sphere and most states require intensity in both polarisations. The carrier signal is here regarded as one polarisation modulated signal and the split carrier signals have to be synchronized in the transmitter with or without communication from the receiver.

Herein all modulators have been depicted as Mach-Zehnder modulators. However, other modulators are possible. E.g. the $I_H$-, $Q_H$-, $I_V$-, and $Q_V$-modulator may be exchanged with other modulators performing IQ-modulation and the $P_H$- and $P_V$-modulators may be exchanged with e.g. electro-absorption modulators. The order in which the P- and the IQ-modulators can appear may also be changed, i.e. the P-modulators to the left and the IQ-modulators to the right.

Figure 4:
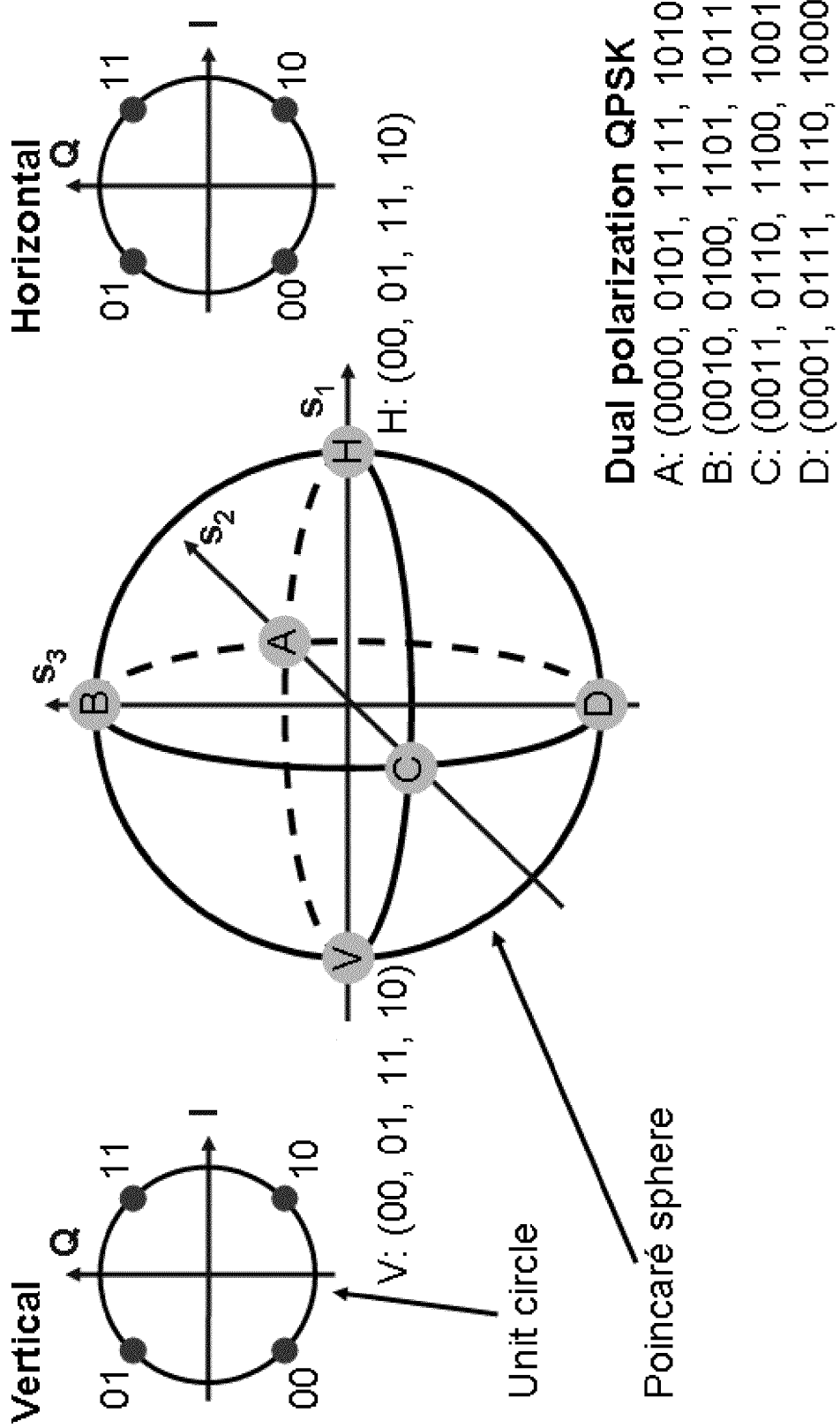
FIG. 4 is a schematic overview of polarisation states in a modulated format.

In FIG. 4, a single polarisation QPSK modulation scheme and a dual polarisation modulation scheme is shown. For single polarisation (SP), as stated, just one polarisation state, "V" or "H" in FIG. 4 is provided, each with four different states, i.e. IQ∈(00, 01, 11, 10).

Normally dual polarisation (DP) QPSK assumes asynchronous symbols but here a case with synchronous symbols will be investigated. In the synchronous case four polarisation states, see "A", "B", "C", and "D" in FIG. 4, are provided. If synchronous channels are provided and phase modulation is performed in these channels, it may be interpreted as a polarisation modulation resulting in 4 polarisation states instead of two. For example, a DP-8PSK system would have in this case shown 8 different polarisation states, each with 8 different phases.

Herein it will now be described how to interpret phase and polarisation modulation. A common way to describe polarised light is to write down the Jones vector for the polarisation state. It is assumed a normalized intensity level and that the horizontal wave gives the reference phase. In this case the Jones vector may be described as $$\bar{J} = \begin{pmatrix} \sqrt{\xi} \\ \sqrt{1-\xi}\, e^{j\psi} \end{pmatrix} \begin{matrix} \xi \in [0, 1] \\ \psi \in [0, 2\pi] \end{matrix} \quad (1)$$

$\xi$ is here a parameter controlling the intensity level between the horizontal, the top element, and the vertical, the bottom element. The polarisation state, $\psi$ is here the phase shift between the two polarisation states. These two parameters now control and completely cover all possible polarisation states.

With use of the elements in the Jones vector the field vector of the light may be described as $$\bar{E} = Ae^{j\phi}\left(\sqrt{\xi}\,\hat{n}_\| + \sqrt{1-\xi}\,e^{j\psi}\hat{n}_\perp\right) \begin{matrix} A \in [0, \sqrt{P}] \\ \phi \in [0, 2\pi] \end{matrix} \quad (2)$$

E is here a 2-dimensional vector with complex vector coefficients in each direction, i.e. a body with 4 dimensions. A stands for the amplitude modulation, P is the total power emitted by the light source, $\phi$ for the phase modulation, and $\xi$ and $\psi$ for the polarisation modulation as explained earlier. $\hat{n}_\|$ is in this case a normalized vector in the horizontal direction and $\hat{n}_\perp$ a normalized vector in the vertical direction.

The amplitude modulation will be disregarded, i.e. A will be given the value $\sqrt{P}$, and the duality between phase and polarisation modulation will be investigated. Eq. (2) may be rewritten as $$\bar{E} = \sqrt{P}(\sqrt{\xi}e^{j\phi}\hat{n}_\| + \sqrt{1-\xi}e^{j(\psi+\phi)}\hat{n}_\perp) \quad (3)$$

It now looks as there are two separate signals, each modulated in its own polarisation domain with amplitude and phase. Considering the congruence of $2\pi$ for phase modulated signals. That gives $$\phi' = \phi (\bmod 2\pi)$$

$$\psi' = (\psi + \phi)(\bmod 2\pi) \quad (4)$$

Eq. (3) may then be rewritten as $$\bar{E} = \sqrt{P}(\sqrt{\xi}e^{j\phi'}\hat{n}_\| + \sqrt{1-\xi}e^{j\psi'}\hat{n}_\perp) \quad (5)$$

The intensity levels are coupled between the horizontal and the vertical polarisation and they should be since the total intensity of the light is not modulated. The $2^{nd}$ degree of freedom for polarisation modulation seems to have vanished; instead 2 separate phase modulation terms are obtained. This means that some part of polarisation modulation may be performed in the phase domain. Please note that the signals $\psi'$ and $\phi'$ needs to be synchronized if this modulation scheme shall work.

Comparing eq. (5) with the expression of an ordinary dual polarisation phase-modulated signal gives $$\bar{E} = \sqrt{P/2}(e^{j\phi''}\hat{n}_\| + e^{j\psi''}\hat{n}_\perp) \quad (6)$$

This gives what part of the polarisation domain a dual polarisation (DP) phase-modulated signal never can access. However, $\phi''$ and $\psi''$ does not need to be synchronized.

Interpreting the field vector in I- and Q-parameters for the phase and in s-parameters for the polarisation, see FIG. 4 for definitions, the phase of the horizontal polarisation is kept as a reference for the polarisation state, will give the following;

$$\begin{cases} s_1 = 2\xi - 1 \\ s_2 = 2\cos(\psi')\sqrt{\xi - \xi^2} \\ s_3 = 2\sin(\psi')\sqrt{\xi - \xi^2} \\ I = \cos(\phi') \\ Q = \sin(\phi') \end{cases} \quad (7)$$

and for a dual polarisation phase-modulated system the I- and Q-parameters are expressed $$\begin{cases} I_\| = \cos(\phi'') \\ Q_\| = \sin(\phi'') \\ I_\perp = \cos(\psi'') \\ Q_\perp = \sin(\psi'') \end{cases} \quad (8)$$

If the phase modulation is detected in quadratures, which is the normal case for a quadrature phase shift keying (QPSK) system, a DP-QPSK system may transmit 4 parameters while a polarisation modulated QPSK system can transmit 5 parameters and thereby more data per state.

Figure 5:
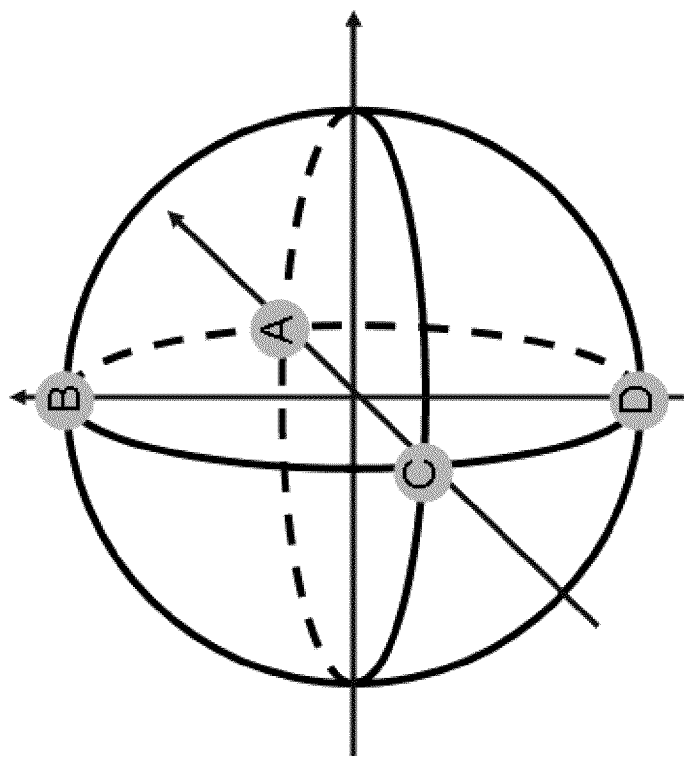
FIG. 5 is a schematic overview of polarisation states in a modulated format.

If the parameter ξ in eq. (7) is omitted, i.e. ξ will be given the value 0.5, a constellation diagram similar to the constellation diagram of a DP-QPSK modulation format will be obtained. The difference between DP-QPSK modulation format and 4Pol-QPSK modulation format is that the latter modulation format makes it possible to Gray-code the symbols on 4-bit level, i.e. a neighbour symbol error will affect 1 bit out of 4 which means that the bit error ratio (BER) will be ¼ of the symbol error ratio (SER). FIG. 5 is a schematic overview of polarisation states of a DP-QPSK and 4Pol-QPSK.

Figure 6:
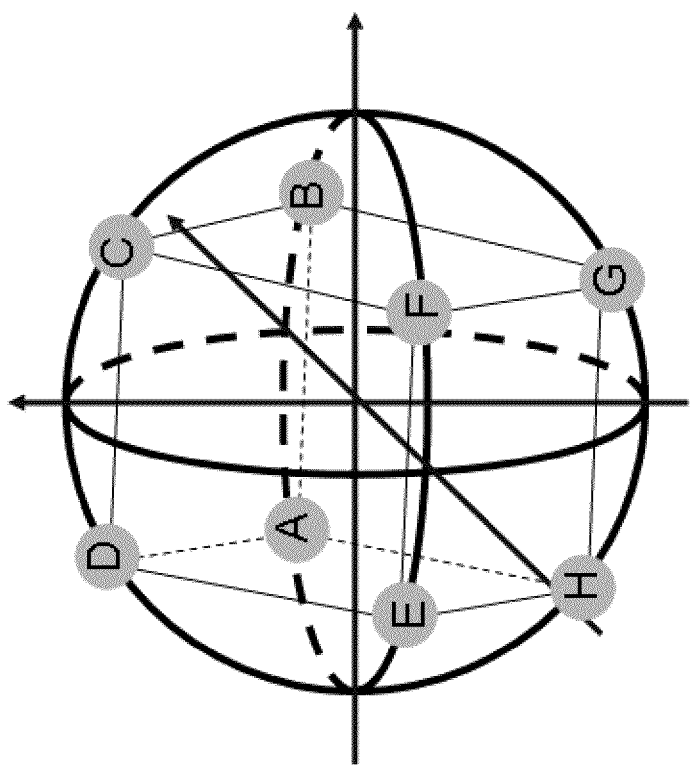
FIG. 6 is a schematic overview of polarisation states in a modulated format.

Using a similar configuration the constellation diagram for 8Pol-QPSK, enabling full use of the polarisation domain may now be depicted. FIG. 6 is a schematic overview of polarisation states of an 8Pol-QPSK modulation with gray code. Here the 8 polarisation states have been spread across the Poincaré sphere as the vertices of a cube. For this modulation format a Gray code is also possible. Here, a neighbour symbol error will only affect 1 bit out of 5 which means that the BER will be ⅕ of the SER.

8 polarisation states have been used in FIG. 6 and placed on the Poincaré sphere as the vertices of a cube. Two s1-levels and four angles in the s2s3-domain and four angles in the phase domain to address are provided. Here, the polarisation modulators 30,31 are operated with binary signals and the IQ-modulators are performing QPSK modulation, i.e. they are driven with binary signals.

Constellation points on the Poincaré sphere:

| s1 | s2 | s3 |
|---|---|---|
| 0.5774 | 0.8165 | 0 |
| 0.5774 | 0 | 0.8165 |
| 0.5774 | −0.8165 | 0 |
| 0.5774 | 0 | −0.8165 |
| −0.5774 | 0.8165 | 0 |
| −0.5774 | 0 | 0.8165 |
| −0.5774 | −0.8165 | 0 |
| −0.5774 | 0 | −0.8165 |

More complex form of modulation in the polarisation domain may be obtained than the depicted 8Pol modulation format depicted in FIG. 6. To exemplify a few; polarisation constellation diagrams of polarisation modulation formats having 8, 16, and 32 polarisation states are depicted in FIGS. 7-10 respectively. Other possibilities may be to use regular polyhedra giving 4, 6, 8, 12, or 20 polarisation states or by using truncated polyhedra giving 8, 12, 14, 24, 32, or 60 polarisation states.

Figure 7:
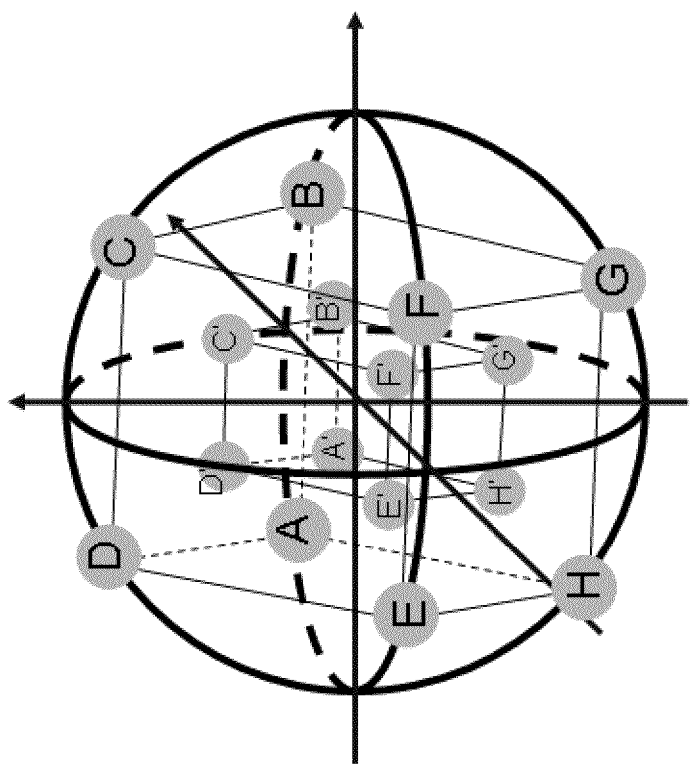
FIG. 7 is a schematic overview of polarisation states in a modulated format.

The modulation format may further be expanded into the amplitude domain with use of amplitude modulated shells in an onion fashion. FIG. 7 is a schematic overview of an 8Pol-QPSK-ASK modulation with a Gray code. Here, a neighbour symbol error will only affect 1 bit out of 6 which means that the BER will be ⅙ of the SER. The 1st bit in the Gray code represents amplitude state, the $2^{nd}$ to $4^{th}$ bit the polarisation state and the last 2 bits represents the phase state.

With the proposed modulation format all polarisation states and all possible phase angles may be reached. This means that polarisation constellations consisting of all possible polyhedrons with vertices touching the surface of the Poincaré sphere may be used. In the phase domain the modulation format may use constellation diagrams based on all possible polygons with vertices touching the unit circle.

The intensity parameter A may also be modulated, see eq. (2). This amplitude modulation does not affect the idea of the present solution; it just works as an extra modulation shell outside the polarisation-phase-modulation scheme, see eq. (3) and (5).

The 8Pol-QPSK modulation scheme is not the only possible modulation format either. Below a few examples of possible modulation formats are given.

Figure 8:
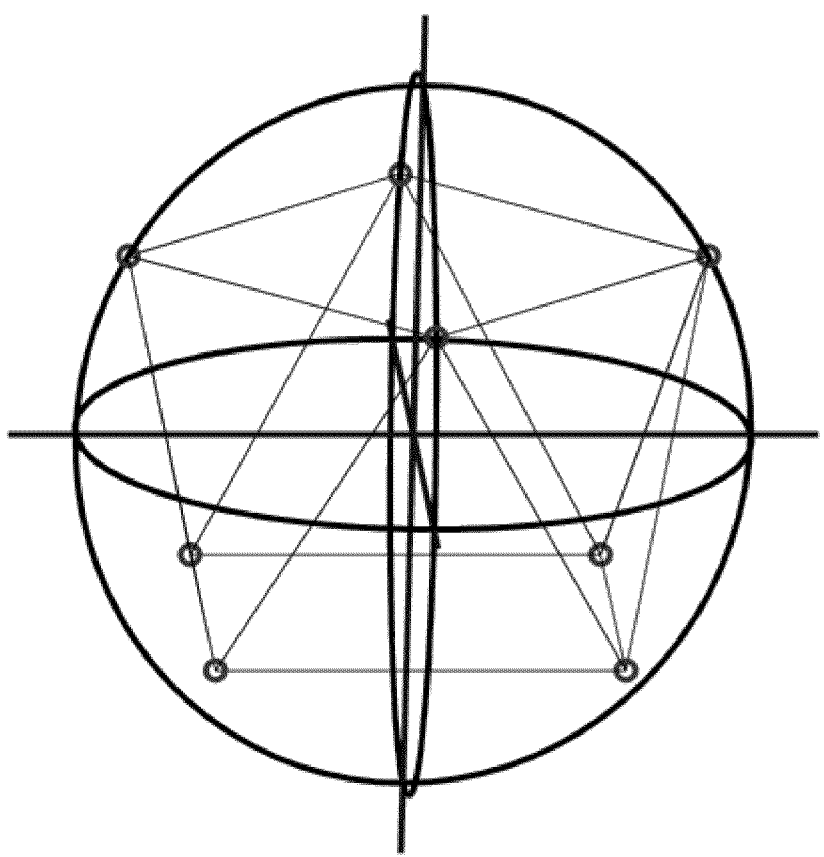
FIG. 8 is a schematic overview of polarisation states in a modulated format.
Figure 9:
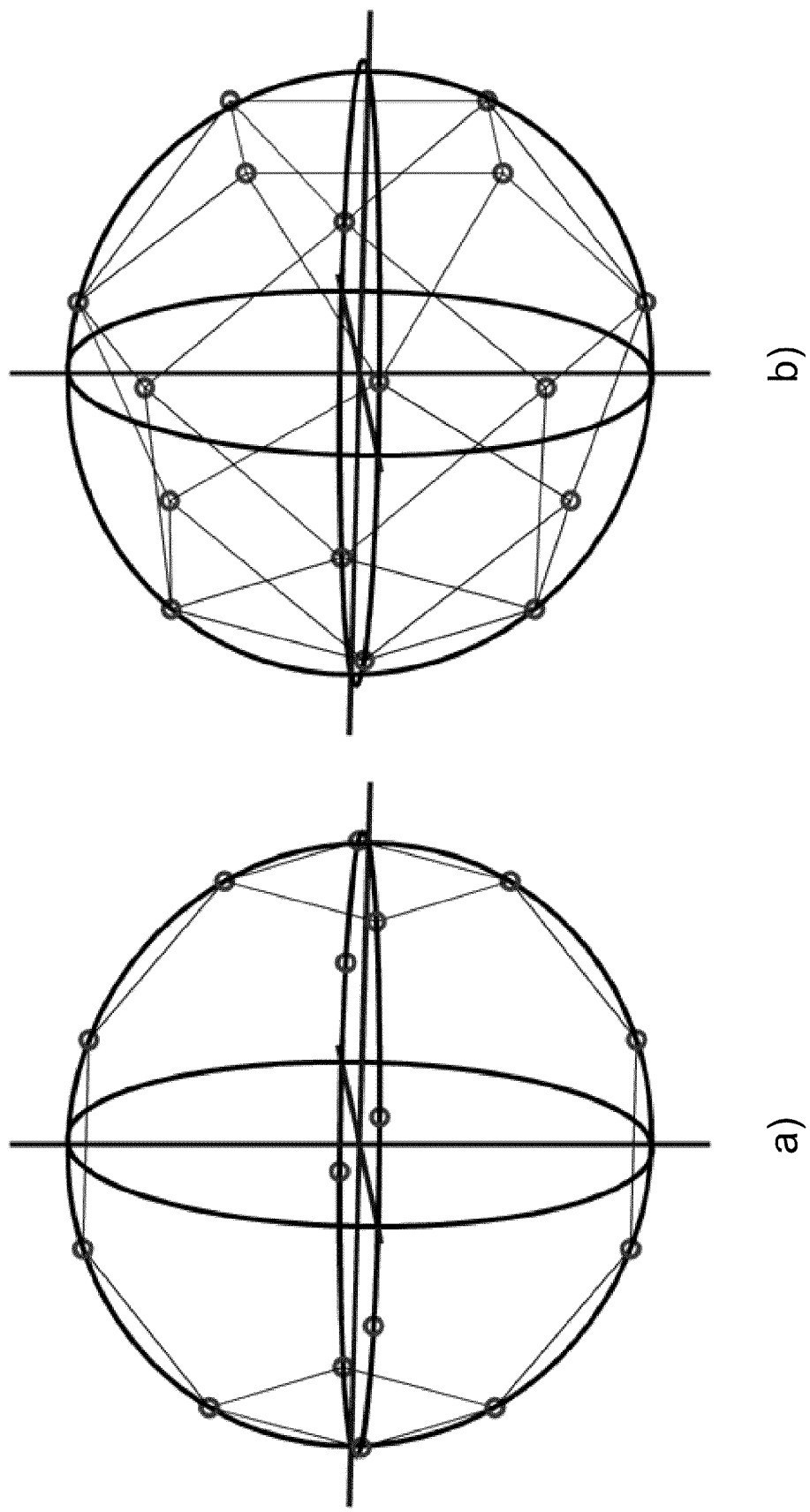
FIGS. 9a-9b are schematic overviews of polarisation states in a modulated format.
Figure 10:
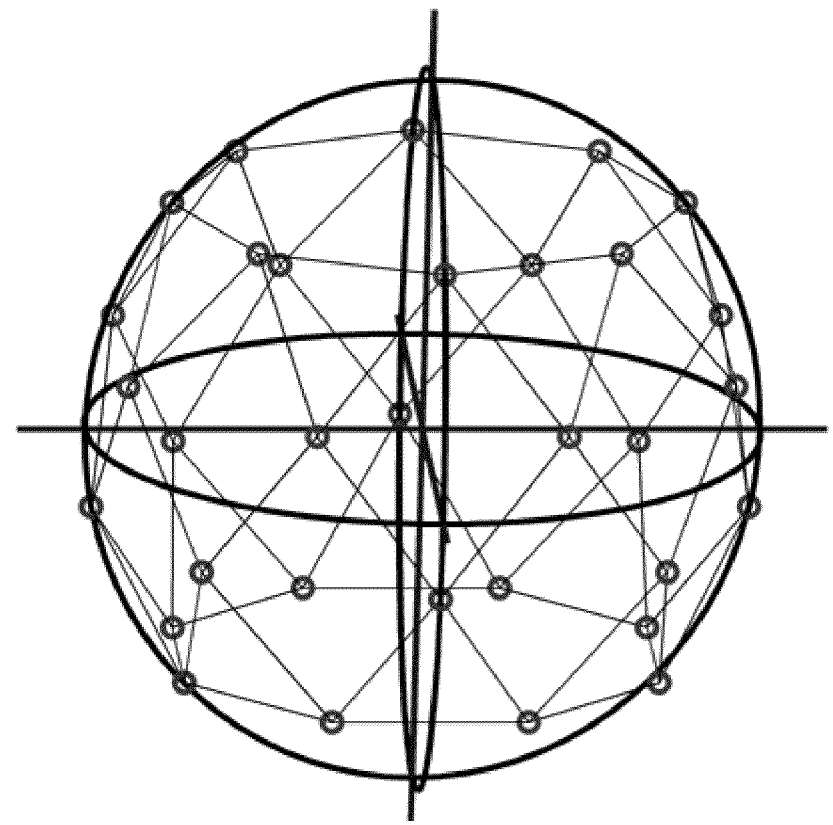
FIGS. 10a-10b are schematic overviews of polarisation states in a modulated format.
Figure 10:
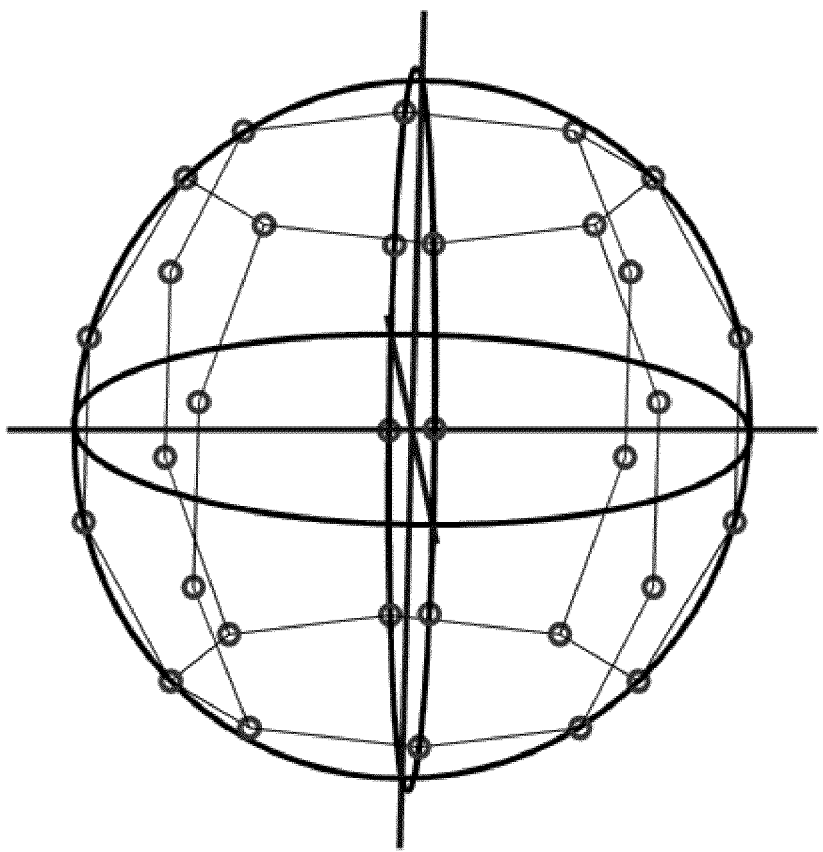

FIG. 8 is a schematic overview of polarisation states of a modulation format based on a square anti-prism. The constellation points are symbolized with small rings, the lines represents the shortest geometrical distance between two constellation points. Each constellation point indicates a certain data. 8 polarisation states have been used and placed on the Poincaré sphere but with increased distance compared to a cube; the number of angles in the s2s3-domain are increased. Two s1-levels and 8 angles in the s2s3-domain and 8 angles in the phase domain to address are provided. Here, the polarisation modulators are operated with binary signals and the IQ-modulators performs 8PSK modulation which requires 4-level signalling. If 8Pol-QPSK is chosen, still 8 angles in the phase domain have to be addressed.

Constellation points on the Poincaré sphere:

| s1 | s2 | s3 |
|---|---|---|
| −0.5111 | 0.6078 | 0.6078 |
| −0.5111 | −0.6078 | 0.6078 |
| −0.5111 | −0.6078 | −0.6078 |
| −0.5111 | 0.6078 | −0.6078 |
| 0.5111 | 0.8595 | 0 |
| 0.5111 | 0 | 0.8595 |
| 0.5111 | −0.8595 | 0 |
| 0.5111 | 0 | −0.8595 |

FIG. 9a is a schematic overview of polarisation states of a modulation format. 16 polarisation states have been used and placed on the Poincaré sphere trying to find a decent trade-off between signal complexity and distance in the polarisation domain. For s1, four levels are to be addressed. Four angles in the s2s3-domain and four angles in the phase domain need to be addressed. Here, the polarisation modulators are operated with 4-level signals and the IQ-modulators are operated with binary signals.

Constellation points on the Poincaré sphere:

| s1 | s2 | s3 |
|---|---|---|
| 0.8722 | 0.0000 | 0.4892 |
| 0.8722 | 0.4892 | 0.0000 |
| 0.8722 | −0.4892 | 0.0000 |
| 0.8722 | 0.0000 | −0.4892 |
| 0.3459 | 0.0000 | 0.9383 |
| 0.3459 | 0.9383 | 0.0000 |
| 0.3459 | −0.9383 | 0.0000 |
| 0.3459 | 0.0000 | −0.9383 |

-continued

| s1 | s2 | s3 |
|---|---|---|
| −0.3459 | 0.0000 | 0.9383 |
| −0.3459 | 0.9383 | 0.0000 |
| −0.3459 | −0.9383 | 0.0000 |
| −0.3459 | 0.0000 | −0.9383 |
| −0.8722 | 0.0000 | 0.4892 |
| −0.8722 | 0.4892 | 0.0000 |
| −0.8722 | −0.4892 | 0.0000 |
| −0.8722 | 0.0000 | −0.4892 |

FIG. 9b is a schematic overview of polarisation states of a modulation format. 16 polarisation states have been used and placed on the Poincaré sphere trying to find a decent trade-off between signal complexity and distance in the polarisation domain. For s1, four levels are to be addressed. Eight angles in the s2s3-domain and eight angles in the phase domain are to be addressed. Here, the polarisation modulators are operated with 4-level signals and the IQ-modulators 8PSK modulation which requires 4-level signalling. If 16Pol-QPSK is chosen, still 8 angles in the phase domain have to be addressed.

Constellation points on the Poincaré sphere:

| s1 | s2 | s3 |
|---|---|---|
| 0.7825 | 0.4403 | 0.4403 |
| 0.7825 | −0.4403 | 0.4403 |
| 0.7825 | −0.4403 | −0.4403 |
| 0.7825 | 0.4403 | −0.4403 |
| 0.2357 | 0.9718 | 0 |
| 0.2357 | 0 | 0.9718 |
| 0.2357 | −0.9718 | 0 |
| 0.2357 | 0 | −0.9718 |
| −0.2357 | 0.6872 | 0.6872 |
| −0.2357 | −0.6872 | 0.6872 |
| −0.2357 | −0.6872 | −0.6872 |
| −0.2357 | 0.6872 | −0.6872 |
| −0.7825 | 0.6227 | 0 |
| −0.7825 | 0 | 0.6227 |
| −0.7825 | −0.6227 | 0 |
| −0.7825 | 0 | −0.6227 |

FIG. 10a is a schematic overview of polarisation states of a modulation format. 32 polarisation states have been used and placed on the Poincaré sphere trying to find a decent trade-off between signal complexity and distance in the polarisation domain. For s1, four levels are to be addressed. Eight angles in the s2s3-domain and eight angles in the phase domain are to be addressed. Here, the polarisation modulators are operated with 4-level signals and the IQ-modulators perform 8PSK modulation which requires 4-level signalling.

Constellation points on the Poincaré sphere:

| s1 | s2 | s3 |
|---|---|---|
| 0.7210 | 0.6930 | 0 |
| 0.7210 | 0.4900 | 0.4900 |
| 0.7210 | 0 | 0.6930 |
| 0.7210 | −0.4900 | 0.4900 |
| 0.7210 | −0.6930 | 0 |
| 0.7210 | −0.4900 | −0.4900 |
| 0.7210 | 0 | −0.6930 |
| 0.7210 | 0.4900 | −0.4900 |
| 0.2652 | 0.9642 | 0 |
| 0.2652 | 0.6818 | 0.6818 |
| 0.2652 | 0 | 0.9642 |
| 0.2652 | −0.6818 | 0.6818 |
| 0.2652 | −0.9642 | 0 |
| 0.2652 | −0.6818 | −0.6818 |
| 0.2652 | 0 | −0.9642 |
| 0.2652 | 0.6818 | −0.6818 |
| −0.2652 | 0.9642 | 0 |
| −0.2652 | 0.6818 | 0.6818 |
| −0.2652 | 0 | 0.9642 |
| −0.2652 | −0.6818 | 0.6818 |
| −0.2652 | −0.9642 | 0 |
| −0.2652 | −0.6818 | −0.6818 |
| −0.2652 | 0 | −0.9642 |
| −0.2652 | 0.6818 | −0.6818 |
| −0.7210 | 0.6930 | 0 |
| −0.7210 | 0.4900 | 0.4900 |
| −0.7210 | 0 | 0.6930 |
| −0.7210 | −0.4900 | 0.4900 |
| −0.7210 | −0.6930 | 0 |
| −0.7210 | −0.4900 | −0.4900 |
| −0.7210 | 0 | −0.6930 |
| −0.7210 | 0.4900 | −0.4900 |

FIG. 10b is a schematic overview of polarisation states of a modulation format.

32 polarisation states have been used and placed on the Poincaré sphere trying to find a decent trade-off between signal complexity and distance in the polarisation domain. However, this time more effort is put on maximizing the distance in the polarisation domain by increasing the number of $s_2s_3$-angles. For $s_1$, four levels are to be addressed. Sixteen angles in the $s_2s_3$-domain and eight or sixteen angles in the phase domain are to be addressed, depending on how many phase states is chosen. In both cases, the polarisation modulators are operated with 4-level signals and the IQ-modulators requires 8-level signalling.

Constellation points on the Poincaré sphere:

| s1 | s2 | s3 |
|---|---|---|
| 0.6485 | 0.7612 | 0 |
| 0.6485 | 0.5383 | 0.5383 |
| 0.6485 | 0 | 0.7612 |
| 0.6485 | −0.5383 | 0.5383 |
| 0.6485 | −0.7612 | 0 |
| 0.6485 | −0.5383 | −0.5383 |
| 0.6485 | 0 | −0.7612 |
| 0.6485 | 0.5383 | −0.5383 |
| 0.2232 | 0.9006 | 0.3730 |
| 0.2232 | 0.3730 | 0.9006 |
| 0.2232 | −0.3730 | 0.9006 |
| 0.2232 | −0.9006 | 0.3730 |
| 0.2232 | −0.9006 | −0.3730 |
| 0.2232 | −0.3730 | −0.9006 |
| 0.2232 | 0.3730 | −0.9006 |
| 0.2232 | 0.9006 | −0.3730 |
| −0.2232 | 0.9748 | 0 |
| −0.2232 | 0.6893 | 0.6893 |
| −0.2232 | 0 | 0.9748 |
| −0.2232 | −0.6893 | 0.6893 |
| −0.2232 | −0.9748 | 0 |
| −0.2232 | −0.6893 | −0.6893 |
| −0.2232 | 0 | −0.9748 |
| −0.2232 | 0.6893 | −0.6893 |
| −0.6485 | 0.7033 | 0.2913 |
| −0.6485 | 0.2913 | 0.7033 |
| −0.6485 | −0.2913 | 0.7033 |
| −0.6485 | −0.7033 | 0.2913 |
| −0.6485 | −0.7033 | −0.2913 |
| −0.6485 | −0.2913 | −0.7033 |
| −0.6485 | 0.2913 | −0.7033 |
| −0.6485 | 0.7033 | −0.2913 |

Figure 11:
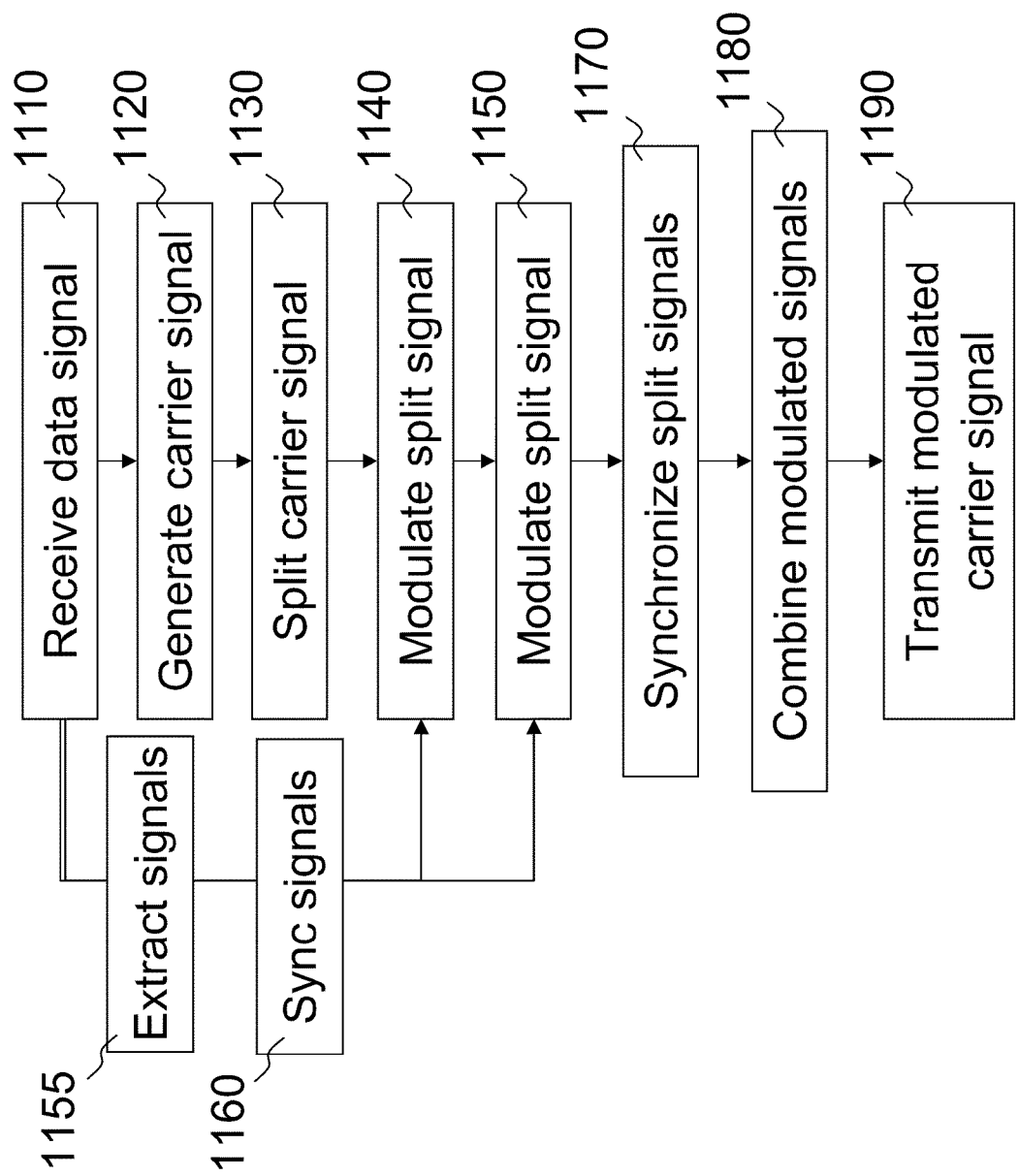
FIG. 11 is a schematic flowchart of a method in a transmitting node.

The method steps in the transmitting node, referred to as transmitting node 10 in the figures, for transmitting data information on a modulated optical carrier signal over an optical channel in an optical communications network to a receiving node 11 according to some embodiments will now be described with reference to a flowchart depicted in FIG. 11. The steps do not have to be taken in the order stated below, but may be taken in any suitable order.

Step 1110. The transmitting node 10 receives a data signal indicating the data information to be transmitted.

Step 1120. The transmitting node 10 generates a carrier signal. For example, the transmitting node 10 may use a local oscillator and a laser arrangement to generate a carrier signal.

Step 1130. The transmitting node 10 splits the carrier signal into two separate signals; a first signal fed to a first modulator 22 for performing In-phase/Quadrature modulation, and a second signal fed to a second modulator 23 for performing In-phase/Quadrature modulation. The first modulator 23 is driven by a first drive signal D1,D7 and a second drive signal D2,D8, and the second modulator is driven by a third drive signal D3,D9 and a fourth drive signal D4,D10.

Step 1140. The transmitting node 10 then modulates the first signal in the first modulator 22 by applying the first and second drive signals D1,D2,D7,D8, to the first modulator 22 and modulates the second signal in the second modulator 23 by applying the third and fourth drive signals D3,D4,D9,D10 to the second modulator 23. Also, a quadrature component in the first signal and in the second signal are phase shifted in a respective phase shifter 26,29.

Step 1150. The transmitting node 10 further modulates the modulated first signal in a third modulator 30,35 for polarisation modulation by applying a fifth drive signal D5, D11 to the third modulator 30,35, and modulates the modulated second signal in a fourth modulator 31,36 for polarisation modulation by applying a sixth drive signal D6,D12 to the fourth modulator 31,36. The third modulator 30,35 is driven by the fifth drive signal D5,D11 and the fourth modulator 31,36 is driven by the sixth drive signal D6,D12.

In some embodiments, the first and second modulators 22,23 may control; phase, a s2 parameter of a Poincaré sphere and an s3 parameter of the Poincaré sphere of the carrier signal. The third and fourth modulators 30,31,35,36 are controlling amplitude and a s1 parameter of the Poincaré sphere of the carrier signal.

Step 1155. The transmitting node 10 extracts all drive signals D1-D6, D7-D12 from the received data signal.

In some embodiments, the drive signals D1-D6, D7-D12 are two level signals, four level signals, eight level signals or any combination thereof.

In some embodiments, the sixth drive signal D6 is an inverse of the fifth drive signal D5.

Step 1160. The transmitting node 10 synchronizes all the drive signals D1-D6, D7-D12.

Step 1170. The transmitting node 10 also synchronizes the first signal with the second signal. This is also known as phase synchronization or carrier synchronization and may be executed in the transmitter using a feed-back loop or the receiver using software/firmware, or as a combination thereof. For example, the receiver may comprise a tracker that follows the polarisation or phase shift and the transmitter uses a circuit to stabilize the split carrier signal. The transmitter may alternatively also synchronize the split signal by comparing phase drift between the split signals in the different modulation loops.

Step 1180. The transmitting node 10 combines the polarisation modulated first signal from the third modulator 30,35 with the polarisation modulated second signal from the fourth modulator 31,35.

Step 1190. The transmitting node 10 then transmits the combined polarisation modulated signal over the optical channel to the receiving node 11.

In some embodiments, the transmitting node further performs a Return to Zero modulation of the carrier signal.

The carrier signal may be modulated to one state of a 4 Polarisation, Pol, -Quadrature Phase-Shift Keying, QPSK, modulation format, 8Pol-QPSK modulation format, 16Pol-QPSK modulation format, 8Pol-8PSK modulation format, 16Pol-8PSK modulation format, 32Pol-8PSK modulation format or 32Pol-16PSK modulation format.

The carrier signal may also be modulated to one state of a x Polarisation-y Phase-Shift Keying-z Amplitude Shift-Keying, xPol-yPSK-zASK, modulation format, wherein the x, y, z parameters are of arbitrary values.

Figure 12:
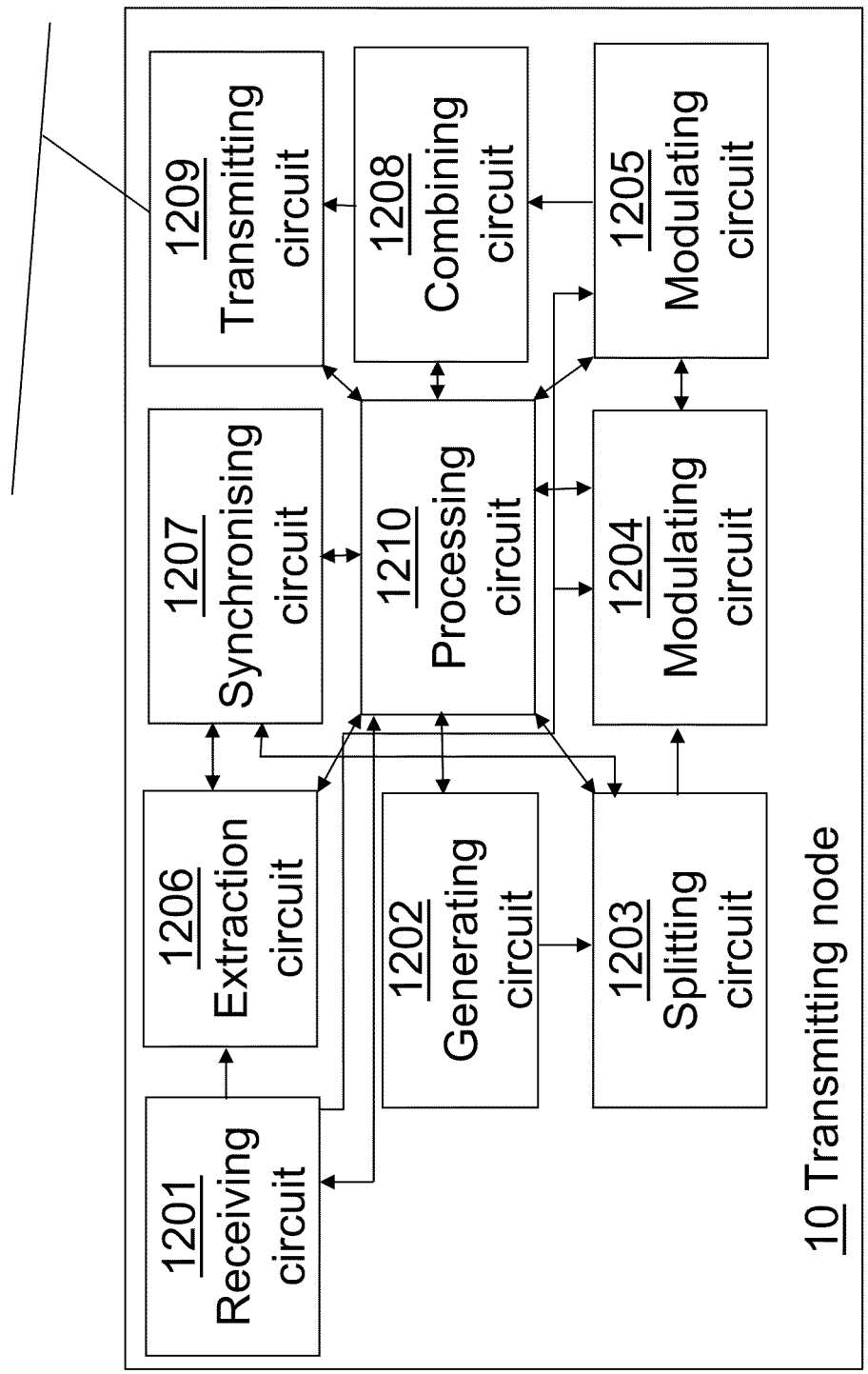
FIG. 12 is a schematic block diagram of a transmitting node.

In order to perform the method steps above for transmitting data information in a modulated optical carrier signal over an optical channel in an optical communications network a transmitting node 10 is provided comprising a modulator chip, or as referred to below being a number of circuits. FIG. 12 is a schematic diagram depicting the transmitting node 10.

The transmitting node 10 comprises a receiving circuit 1201 configured to receive a data signal indicating the data information to be transmitted and a generating circuit 1202 configured to generate a carrier signal.

The transmitting node 10 further comprises a splitting circuit 1203 coupled to the generating circuit 1202 and configured to split the carrier signal into two separate signals; a first signal fed to a first modulator 22 for performing In-phase/Quadrature modulation and a second signal fed to a second modulator 23 for performing In-phase/Quadrature modulation. The first modulator is driven by a first drive signal D1,D7 and a second drive signal D2,D8 and the second modulator is driven by a third drive signal D3,D9 and a fourth drive signal D4,D10.

The transmitting node 10 comprises a modulating circuit 1204 comprising the first, second modulators 22,23 and two phase shifters 26,29. The modulating circuit 1204 is coupled to the splitting circuit 1203 and the receiving circuit 1201, and is configured to modulate the first signal in the first modulator 22 by applying the first and second drive signals D1,D2,D7, D8 to the first modulator 22, and the second signal in the second modulator 23 by applying the third and fourth drive signals D3,D4,D9,D10 to the second modulator 23. A quadrature component in the first signal and in the second signal are configured to be phase shifted in the respective phase shifters 26,29.

The transmitting node 10 also comprises an additional modulating circuit 1205 comprising a third modulator 30,35 for polarisation modulation and a fourth modulator 31,36 for polarisation modulation. The additional modulating circuit 1205 is coupled to the modulating circuit 1204 and the receiving circuit 1201. Additionally, the additional modulating circuit 1205 is configured to modulate the modulated first signal in the third modulator 30,35 by applying a fifth drive signal D5, D11 to the third modulator 30.35, and the modulated second signal in the fourth modulator 31,36 by applying a sixth drive signal D6, D12 to the fourth modulator 31,36. The third modulator 30,35 is driven by the fifth drive signal D5,D11 and the fourth modulator 31,36 is driven by the sixth drive signal D6,D12.

In some embodiments, the first and second modulators 22,23 are arranged to control phase, a s2 parameter of a Poincaré sphere and an s3 parameter of the Poincaré sphere of the carrier signal, and the third and fourth modulators 30,31, 35,36 are arranged to control amplitude and a s1 parameter of the Poincaré sphere of the carrier signal.

The transmitting node 10 further comprises an extraction circuit 1206 coupled to the receiving circuit 1201 and configured to extract all drive signals D1-D6, D7-D12 from the received data signal. In some embodiments, the drive signals D1-D6, D7-D12 are two level signals, four level signals, eight level signals or any combination thereof.

In some embodiments, the sixth drive signal D6 is an inverse of the fifth drive signal D5.

The transmitting node 10 comprises a synchronizing circuit 1207 configured to synchronize the first signal with the second signal. The synchronizing circuit 1207 is further coupled to the extraction circuit 1206 and further configured to synchronize all the drive signals D1-D6, D7-D12.

The transmitting node 10 comprises a combining circuit 1208 coupled to the modulating circuits 1204,1205 and configured to combine the polarisation modulated first signal from the third modulator 30,35 with the polarisation modulated second signal from the fourth modulator 31,36.

Furthermore, the transmitting node 10 comprises a transmitting circuit 1209 coupled to the combining circuit 1208 and configured to transmit the combined signal over the optical channel to the receiving node 11. The modulator chip may then comprise all or parts of the circuits.

In some embodiments, the transmitting node further a circuit to perform a Return to Zero modulation of the carrier signal.

The carrier signal may be modulated to one state of a 4 Polarisation, Pol, -Quadrature Phase-Shift Keying, QPSK, modulation format, 8Pol-QPSK modulation format, 16Pol-QPSK modulation format, 8Pol-8PSK modulation format, 16Pol-8PSK modulation format, 32Pol-8PSK modulation format or 32Pol-16PSK modulation format.

The carrier signal may also be modulated to one state of a x Polarisation-y Phase-Shift Keying-z Amplitude Shift-Keying, xPol-yPSK-zASK, modulation format, wherein the x, y, z parameters are of arbitrary values.

Figure 13:
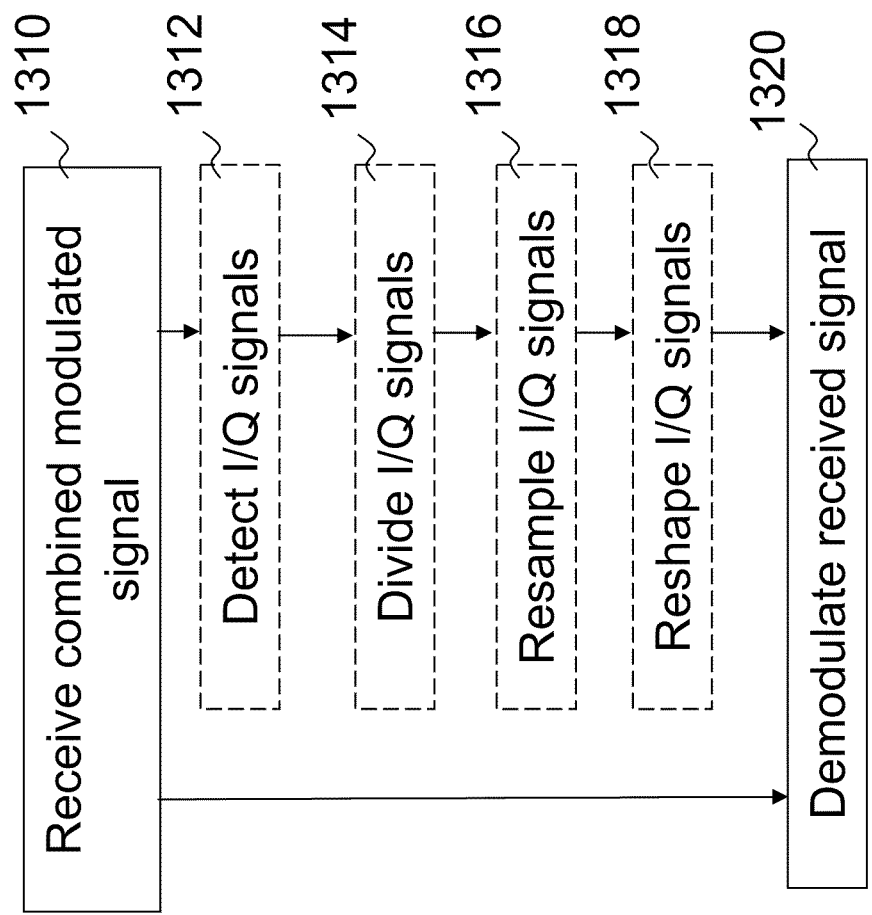
FIG. 13 is a schematic flowchart of a method in a receiving node.

The method steps in the receiving node, referred to as receiving node 11 in the figures, for receiving the modulated optical carrier signal over an optical channel in an optical communications network from the transmitting node 10 according to some embodiments will now be described with reference to a flowchart depicted in FIG. 13. The steps do not have to be taken in the order stated below, but may be taken in any suitable order. The transmitting and receiving nodes 10,11 are comprised in an optical communications network.

Step 1310. The receiving node 11 receives a combined polarisation modulated carrier signal from the transmitting node 10.

The carrier signal has been split into two separate signals, a first and second signal, which first and second signals have been In-phase/Quadrature modulated. A quadrature component in the first signal and a quadrature component in the second signal have been phase shifted. The modulated first signal has further been polarisation modulated and the modulated second signal has been polarisation modulated and these signals have been combined and transmitted over the optical channel to the receiving node 11.

Step 1312. This is an optional step as indicated by the dashed line. The receiving node 11 may detect In-phase/Quadrature signals of different polarisation in the combined polarisation modulated signal.

Step 1314. This is an optional step as indicated by the dashed line. The receiving node 11 may divide the In-phase/Quadrature signals in the polarisation domain.

Step 1316. This is an optional step as indicated by the dashed line. The receiving node 11 may resample the In-phase/Quadrature signals.

Step 1318. This is an optional step as indicated by the dashed line. The receiving node 11 may reshape the In-phase/Quadrature signals. Then the demodulating step 1320 comprises extracting signals of a Poincaré sphere from the reshaped signal. In some embodiments, the extracted signals comprise s1, s2 and s3 parameters of the Poincaré sphere as well as Inphase and Quadrature parameters.

Step 1320. The receiving node 11 further demodulates the received combined polarisation modulated carrier signal by extracting signals of a Poincaré sphere from the received combined polarisation modulated carrier signal. The signals are used to determining state of the received combined polarisation modulated carrier signal indicating the data signal transmitted.

Figure 14:
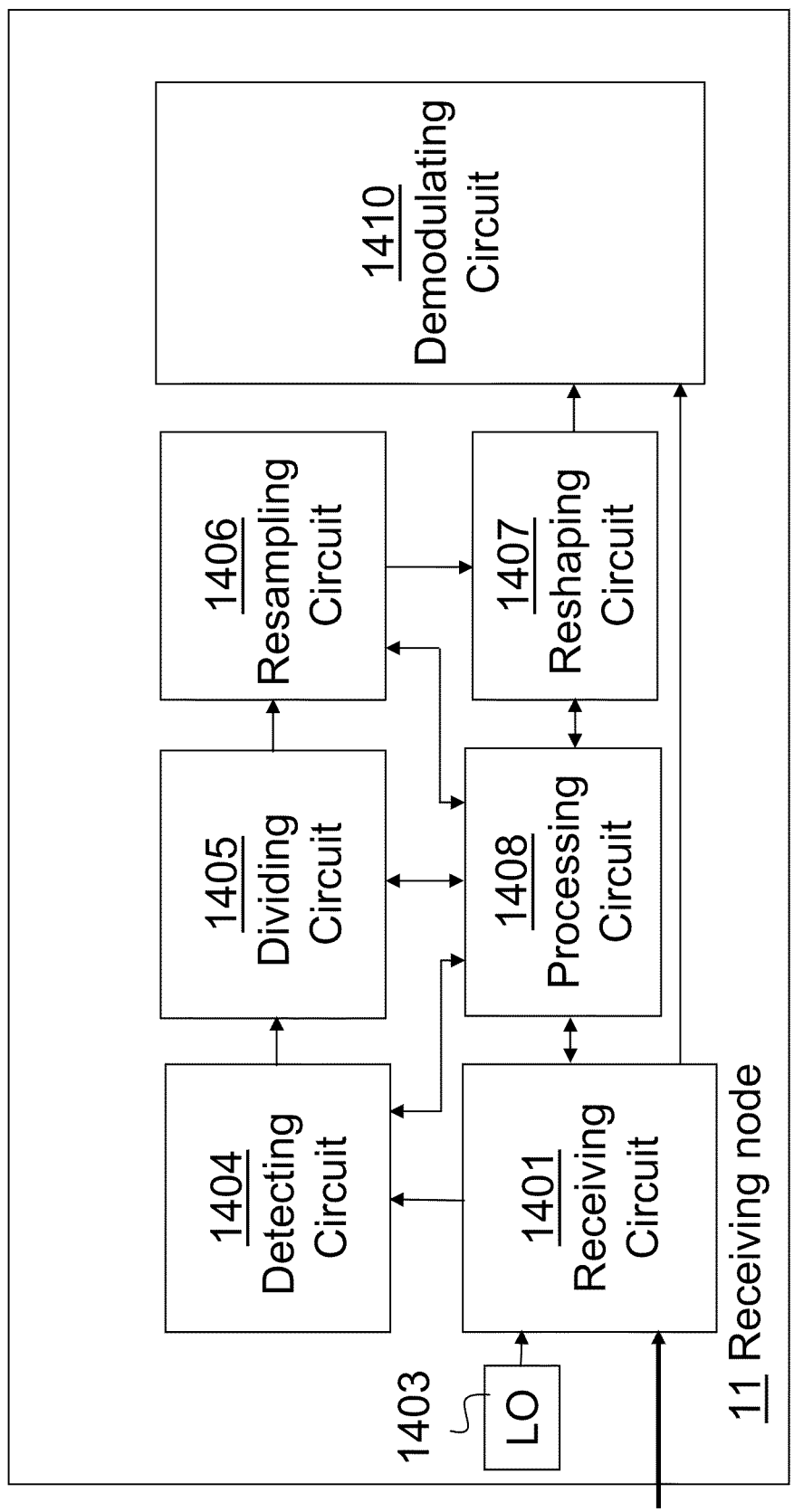
FIG. 14 is a schematic block diagram of a receiving node.

FIG. 14 is a schematic overview depicting the receiving node 11. The receiving node 11 comprises a receiving circuit 1401 which partly may rely on a classical hardware of a DP-QPSK receiver. The rest of the receiver is intended to be implemented in software/firmware. Full use of the polarisation domain will require some changes in the software but not in the hardware, that is, in comparison to a classical DP-QPSK receiver. The receiving circuit 1401 is configured to receive the combined polarisation modulated signal from the transmitting node 10. The combined polarisation modulated carrier signal has been modulated according to what is stated above. That is, the carrier signal has been split into two separate signals, a first and second signal, which first and second signals have been In-phase/Quadrature modulated. A quadrature component in the first signal and a quadrature component in the second signal have been phase shifted. The modulated first signal has then been polarisation modulated and the modulated second signal has been polarisation modulated and these signals have been combined and transmitted over the optical channel to the receiving node 11.

The receiving circuit 1401 may be coupled to a local oscillator LO 1403 to enable signal retrieval.

The receiving node 11 further comprises a demodulating circuit 1410 coupled to the receiving circuit 1401 and configured to demodulate the received modulated signal and further configured to extract signals of a Poincaré sphere from the received modulated signal. From the extracted signals the demodulating circuit 1410 determines state of the received modulated signal. The demodulating circuit 1410 may perform symbol detection by performing clock recovery, distortion compensation, chromatic dispersion compensation, phase recovery and polarisation recovery.

The polarisation recovery module in the demodulator is redesigned and needs to communicate with the block that takes the decision of which symbol or state that was detected.

A traditional DP-QPSK receiver detects the signals $I_H$, $Q_H$, $I_V$, and $Q_V$, which are different from the drive signals $I_H$, $Q_H$, IV, and $Q_V$ used in the transmitter. For 8Pol-QPSK it is intended to detect the signals s1, s2, s3, I, and Q. The first 3 signals describe the polarisation state, 8 in total, and the last two the phase for that particular polarisation state, 4 in total. This means that binary decision are possible for all retrieved signals in the receiver and below it is demonstrated one way to do it. The optical phase has been chosen to be measured with reference to horizontal polarisation; of course other polarisation states as the reference state which will cause a slight change in the formulae below may as well be chosen. If amplitude modulation is used, s0 describes the intensity (or the amplitude) of the received signal.

It is assumed that the DP-QPSK receiver already has detected the signals $I_H$, $Q_H$, $I_V$, and $Q_V$. These signals are assumed to be correctly divided in the polarisation domain, correctly resampled and correctly reshaped. The signals s0, s1, s2, s3, I, and Q are then extracted according to eq. (9).

$$\begin{cases} s0 = I_H^2 + Q_H^2 + I_V^2 + Q_V^2 = \sqrt{s1^2 + s2^2 + s3^2} \\ s1 = I_H^2 + Q_H^2 - I_V^2 - Q_V^2 \\ s2 = 2(I_H I_V + Q_H Q_V) \\ s3 = 2(I_H Q_V - I_V Q_H) \\ I = I_H / \sqrt{I_H^2 + Q_H^2} \text{ or } I = I_V / \sqrt{I_V^2 + Q_V^2} \\ Q = Q_H / \sqrt{I_H^2 + Q_H^2} \text{ or } Q = Q_V / \sqrt{I_V^2 + Q_V^2} \end{cases} \quad (9)$$

The receiving node 11 may further comprise a detecting circuit 1404 coupled to the receiving circuit 1401 and configured to detect In-phase/Quadrature signals of different polarisation in the combined polarisation modulated signal. In addition, the receiving node 11 may comprise a dividing circuit 1405 coupled to the detecting circuit 1404 and configured to divide the In-phase/Quadrature signals in the polarisation domain. Furthermore, the receiving node 11 may comprise a resampling circuit 1406 coupled to the dividing circuit 1405 and configured to resample the In-phase/Quadrature signals and also a reshaping circuit 1407 coupled to the resampling circuit 1406 and configured to reshape the In-phase/Quadrature signals. The demodulating circuit 1410 may then be configured to extract signals of a Poincaré sphere from the reshaped signal. The extracted signals may in some embodiments comprise s1, s2 and s3 parameters of the Poincaré sphere as well as In-phase and Quadrature parameters.

The present mechanism for transmitting a modulated optical carrier signal and demodulating the optical carrier signal may be implemented through one or more processors, such as a processor circuit 1210 in the transmitting node 10 depicted in FIG. 12 or such as a processor circuit 1408 in the receiving node 11 depicted in FIG. 14, together with computer program code for performing the functions of the present solution. The program code mentioned above may also be provided as a computer program product, for instance in the form of a data carrier carrying computer program code for performing the present solution when being loaded into the transmitting or receiving node. One such carrier may be in the form of a CD ROM disc. It is however feasible with other data carriers such as a memory stick. The computer program code may furthermore be provided as pure program code on a server and downloaded to the transmitting node 10 or the receiving node 11.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in a transmitting node for transmitting data information in a modulated optical carrier signal over an optical channel in an optical communications network to a receiving node, the method comprising:

receiving a data signal indicating the data information to be transmitted, extracting drive signals from the received data signal, including a first, second, third, fourth, fifth, and sixth drive signal, synchronizing said drive signals, generating a carrier signal, splitting the carrier signal into two separate signals, a first signal fed to a first modulator for performing In-phase/Quadrature modulation and a second signal fed to a second modulator for performing In-phase/Quadrature modulation, synchronizing the first signal with the second signal, modulating the first signal in the first modulator by applying the first and second drive signals to the first modulator, and modulating the second signal in the second modulator by applying the third and fourth drive signals to the second modulator, wherein a quadrature component in the first signal and in the second signal are phase shifted in a phase shifter, modulating the modulated first signal in a third modulator for polarisation modulation by applying the fifth drive signal to the third modulator, and modulating the modulated second signal in a fourth modulator for polarisation modulation by applying the sixth drive signal to the fourth modulator, wherein third modulator is driven by the fifth drive signal and the fourth modulator is driven by the sixth drive signal, combining the polarisation modulated first signal from the third modulator with the polarisation modulated second signal from the fourth modulator, and transmitting the combined signal over the optical channel to the receiving node.

2. The method according to claim 1, wherein the drive signals are two level signals, four level signals, eight level signals or any combination thereof.

3. The method according to claim 1, wherein the sixth drive signals is an inverse of the fifth drive signal.

4. The method according to claim 1, further comprising Return to Zero modulating the carrier signal.

5. The method according to claim 1, wherein the carrier signal is modulated to one state of a 4 Polarisation, Pol, -Quadrature Phase-Shift Keying, QPSK, modulation format, 8Pol-QPSK modulation format, 16Pol-QPSK modulation format, 8Pol-8PSK modulation format, 16Pol-8PSK modulation format, 32Pol-8PSK modulation format or 32Pol-16PSK modulation format.

6. The method according to claim 1, wherein the carrier signal is modulated to one state of a x Polarisation-y Phase-Shift Keying-z Amplitude Shift-Keying, xPol-yPSK-zASK, modulation format, wherein the x, y, z parameters are of arbitrary values.

7. The method according to claim 1, wherein the first and second modulators control phase, a s2 parameter of a Poincaré sphere and an s3 parameter of the Poincaré sphere of the carrier signal, and the third and fourth modulators control amplitude and a s1 parameter of the Poincaré sphere of the carrier signal.

8. A transmitting node configured to transmit data information in a modulated optical carrier signal over an optical channel in an optical communications network, the transmitting node comprising:

a receiving circuit configured to receive a data signal indicating the data information to be transmitted, an extraction circuit coupled to the receiving circuit and configured to extract drive signals from the received data signal, including a first, second, third, fourth, fifth, and sixth drive signal, a synchronizing circuit coupled to the extraction circuit and configured to synchronise said drive signals, a generating circuit configured to generate a carrier signal, a splitting circuit coupled to the generating circuit and configured to split the carrier signal into two separate signals, a first signal fed to a first modulator for performing In-phase/Quadrature modulation and a second signal fed to a second modulator for performing In-phase/Quadrature modulation, wherein the synchronization circuit is further configured to synchronise the first signal with the second signal, a modulating circuit comprising the first and second modulators and two phase shifters, wherein the modulating circuit is coupled to the splitting circuit and the receiving circuit and is configured to modulate the first signal in the first modulator by applying the first and second drive signals to the first modulator, and to modulate the second signal in the second modulator by applying the third and fourth drive signals to the second modulator, and wherein the phase shifters are configured to phase shift a quadrature component in the first signal and in the second signal, an additional modulating circuit comprising a third modulator for polarisation modulation and a fourth modulator for polarisation modulation, wherein the additional modulating circuit is coupled to the modulating circuit and the receiving circuit, and is configured to modulate the modulated first signal in the third modulator by applying the fifth drive signal to the third modulator and to modulate the modulated second signal in the fourth modulator by applying the sixth drive signal to the fourth modulator, wherein the third modulator is driven by the fifth drive signal and the fourth modulator is driven by the sixth drive signal, a combining circuit coupled to the modulating circuits and configured to combine the polarisation modulated first signal from the third modulator with the polarisation modulated second signal from the fourth modulator, and a transmitting circuit coupled to the combining circuit and configured to transmit the combined signal over the optical channel to the receiving node.

9. The transmitting node according to claim 8, wherein the drive signals are two level signals, four level signals, eight level signals or any combination thereof.

10. The transmitting node according to claim 8, wherein the sixth drive signals is an inverse of the fifth drive signal.

11. The transmitting node according to claim 8, wherein the carrier signal is Return to Zero modulated.

12. The transmitting node according to claim 8, wherein the carrier signal is modulated to one state of a 4 Polarisation, Pol, -Quadrature Phase-Shift Keying, QPSK, modulation format, 8Pol-QPSK modulation format, 16Pol-QPSK modulation format, 8Pol-8PSK modulation format, 16Pol-8PSK modulation format, 32Pol-8PSK modulation format or 32Pol-16PSK modulation format.

13. The transmitting node according to claim 8, wherein the carrier signal is modulated to one state of a x Polarisation-y Phase-Shift Keying-z Amplitude Shift-Keying, xPol-yPSK-zASK, modulation format, wherein the x, y, z parameters are of arbitrary values.

14. The transmitting node according to claim 8, wherein the first and second modulators control phase, a s2 parameter of a Poincaré sphere and an s3 parameter of the Poincaré sphere of the carrier signal, and the third and fourth modulators control amplitude and a s1 parameter of the Poincaré sphere of the carrier signal.

* * * * *